United States Patent

Macé

[11] Patent Number: 6,128,152
[45] Date of Patent: *Oct. 3, 2000

[54] METHOD AND APPARATUS FOR REGULATING THE SPEED OF A TAPE

[75] Inventor: Philippe Macé, Kappel, Germany

[73] Assignee: Deutsche Thomson-Brandt GmbH, Villingen-Schwenningen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/464,752

[22] PCT Filed: Dec. 4, 1993

[86] PCT No.: PCT/EP93/03413

§ 371 Date: Dec. 6, 1995

§ 102(e) Date: Dec. 6, 1995

[87] PCT Pub. No.: WO94/15337

PCT Pub. Date: Jul. 7, 1994

[30] Foreign Application Priority Data

Dec. 22, 1992 [DE] Germany ............... 42 43 329

[51] Int. Cl.[7] ................................................. G11B 15/48
[52] U.S. Cl. ............................................ 360/74.1; 360/69
[58] Field of Search .................................. 360/74.1, 74.2, 360/74.4, 73.01, 73.06, 71; 242/334.2, 333.1, 333.2, 333.3, 333.4; 318/439, 270, 560–561, 269, 268

[56] References Cited

U.S. PATENT DOCUMENTS

| | | |
|---|---|---|
| 3,736,565 | 5/1973 | Sidline . |
| 4,507,592 | 3/1985 | Anderson ............................. 318/268 |
| 4,511,937 | 4/1985 | Guerrero .............................. 360/72.1 |
| 4,731,679 | 3/1988 | O'Gwynn et al. .................... 360/73 |
| 4,800,450 | 1/1989 | Rodal et al. ...................... 360/74.1 X |
| 5,287,233 | 2/1994 | Lee et al. ........................... 360/71 X |
| 5,669,804 | 9/1997 | Takahashi et al. ................... 451/59 |

Primary Examiner—Paul Loomis
Assistant Examiner—K. Wong
Attorney, Agent, or Firm—Joseph S. Tripoli; Frederick A. Wein; Joseph J. Kolodka

[57] ABSTRACT

In an operational mode in which the tape should come to a stop at predetermined positions, a braking process, which causes the stopping of a tape at an exact predetermined place, is provided. At the beginning of the braking process, a target waveform is determined in dependence on the tape speed, and the values of the speed are controlled or regulated in accordance with the waveform. Control of a slow motion mode of a video tape can also be provided.

18 Claims, 3 Drawing Sheets

METHOD AND APPARATUS FOR REGULATING THE SPEED OF A TAPE

FIELD OF THE INVENTION

The present invention relates to a method and an apparatus for regulating the speed of a tape for the recording and/or reproduction of items of information, such as a video tape for example, in an operational mode in which the tape is intended to come to a stop at predetermined positions.

BACKGROUND OF THE INVENTION

Known operational modes in which a tape for the recording and/or reproduction of items of information should come to a stop at predetermined positions are, for example, the so-called slow motion mode and the freeze frame mode of a video apparatus. Thereby, a video tape is scanned by a video head in such a way that individual items of picture and/or sound information recorded on this video tape are read out on each occasion for a defined time t. For this, the tape is wound so far that the items of information for a first picture come into the spatial region of the video head. After the time t, the tape is wound on in such a way that items of information for a next picture are located in the region of the video head. Later on, the reproduction of a further picture can occur, and so on.

Thereby, it is important that the tape be brought to a standstill as accurately as possible in such a way that the beginning of the current items of picture information always coincide exactly with the region of the video head. This means, in particular, that an exactly executed delaying or braking process has to be instituted at the end of each winding on sequence so that a precise stopping of the tape is ensured.

Known apparatus, such as video apparatus for example, institute a braking process after a defined winding on time, during which, braking means such as a motor, a mechanical brake or the like, are controlled by fixed, defined control signals. This means that tolerances, which are occasioned, for example, by manufacturing tolerances of the apparatus, by different video tapes, by temperature effects and the like, are not taken into account.

The object of the present invention is to further develop the course of a braking process of the said kind in such a way that a tape for the recording and/or reproduction of items of information is brought to a halt, as exactly as possible, at predetermined positions.

This object is achieved by a method in accordance with claim 1 and by an apparatus in accordance with the first apparatus claim.

SUMMARY OF THE INVENTION

Advantageous developments of the invention are specified in the appendant claims.

In accordance with the invention, a braking process which effects an exact stoppage of a tape for recording and/or reproduction, such as a video tape for example, is realised in that, at the beginning of the braking process, a target waveform is determined to which the actual values of the speed are controlled or regulated. These target values, or else, their time-related waveform, may be determined for example on the basis of the tape speed and/or position at the beginning of the braking process.

Further features, advantages and details of the invention are explained in the following embodiments with the help of the drawing. Therein

DETAILED DESCRIPTION OF THE INVENTION

Before going into the detailed description of the embodiments, it is pointed out that the blocks individually illustrated in the Figures merely serve for a better understanding of the invention. Usually, individual ones or several of these blocks are combined into units. These may be realised in integrated or hybrid technology or as a programme controlled micro-processor or as part of a programme that is suitable for its programming.

The elements contained in the individual stages may also, however, be implemented separately.

Figure 1:
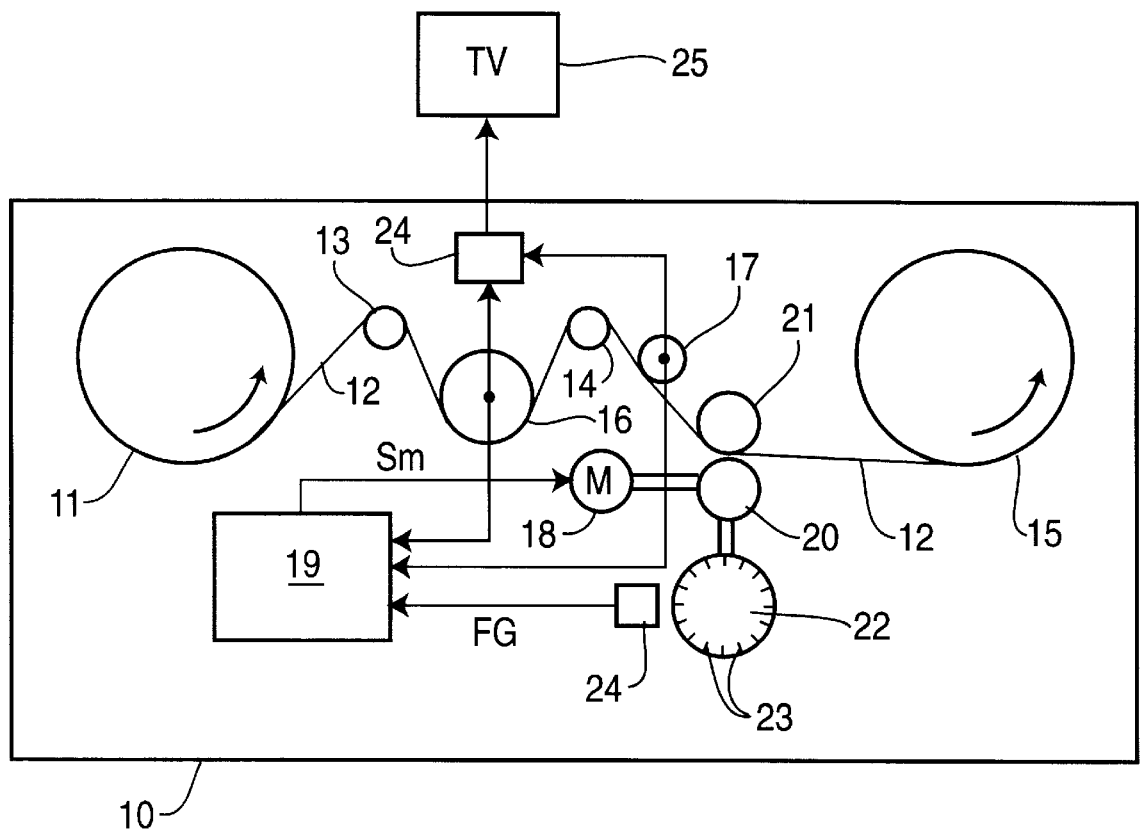
FIG. 1 shows a block circuit diagram of a preferred embodiment.

FIG. 1 shows the block circuit diagram of a first embodiment in which a video recorder is symbolically indicated by 10. The latter contains a first spool 11 from which a video tape 12 is wound onto a second spool 15 over deflecting rollers 13, 14. The video tape 12 is led past a video head 16 and a reading head 17. The speed of the tape 12 is controlled by a driving motor 18, also known as a capstan motor, which receives corresponding control signals Sm from an electronic control device 19. The motor 18 is mechanically coupled, for example via drive belts or the like, to a drive wheel 20 which, with a complementary roller 21, effects the transport of the tape 12 at a defined speed. The latter can be measured by means of a tachometer wheel 22 upon which there are introduced equally spaced markings 23. The latter may be optical or magnetic for example, and are detected by a sensor 24 which is formed as an optical sensor, Hall sensor or the like and sends its output signal FG to the control device 19.

Figure 2:
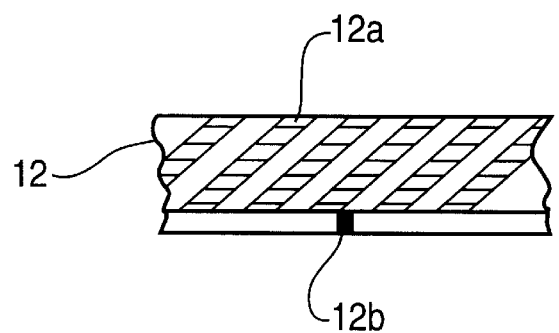
FIG. 2 provides a symbolic illustration of a video tape.

As illustrated symbolically in FIG. 2, apart from the items of video information 12a, control pulses 12b are also stored on the video tape 12 at a predetermined position with reference to the items of video information 12a. Whilst the video head 16 is reading out the video signals 12a and passing them on via appropriate processing stages 24 to a display device 25, such as a television set for example, the reading head 17 receives the control signals 12b. In addition, it may be constructed in such a way that it receives audio signals from the tape 12. The signals from the reading head 17 are led to the electronic control device 19 and to the processing stages 24.

Figure 3:
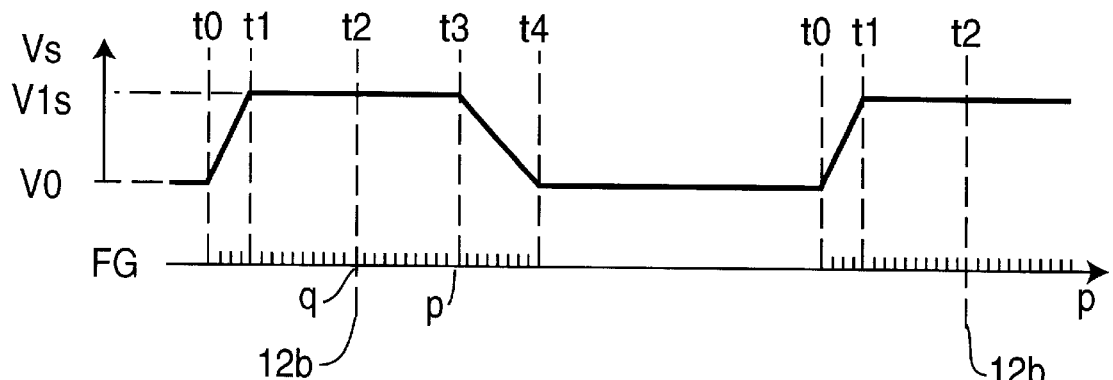
FIGS. 3, 4, 6 illustrate waveforms of the speed values of a video tape for the embodiment of FIG. 1.

The uppermost curve of FIG. 3 shows the waveform of the reference speed Vs of the tape 12 during a slow motion mode. After a video picture has been read out for a given period of time, the motor 18 is controlled by the control device 19 at a time point to in such a way that the tape 12 accelerates from v0 =0 up to v1 in a time interval t0–t1 and thereafter, it is then transported further at this speed. At a time point t2, the reading head 17 detects the control signal 12b and the motor is braked by the control device 19 at a time point t3. The reference waveform of the braking is such that the tape 12 comes to a stop (v0) at the time point t4. Thereafter, the tape 12 remains still for a given time period t4–t0.

During the whole operation, the control device 19 is receiving the signals FG wherein the number of pulses per unit of time increases with increasing speed v. Thereby, the number of pulses appearing is a measure for the actual number of revolutions of the drive roller 20 and thus, in essence, also for the actual length of the transported tape 12. The separation in time between two pulses is a measure for the actual speed of the drive roller 20 and thus, in essence, also for the tape 12.

In order to regulate the actual values i.e. a real progression, of the spooled-on length of the tape and of the speed Vi as exactly as possible to the reference values, the embodiment functions in accordance with the method described more fully below.

What is essential for the slow motion mode, for a freeze frame mode and the like, is that the tape 12 always comes to a stop at a predetermined position at the time t4. In order to compensate errors in the starting phase (t0–t3), a counter is started upon the appearance of the pulse 12b at the time point t2. The counter is contained in the control device 19 and counts back by one unit starting from a number q with each new pulse of FG. That is to say, with the appearance of the pulse 12b, the control device 19 has a value available which is a measure for the remaining length of tape up to the stopping of the tape 12. When the backwardly counting counter has reached a value p, the control device 19 then institutes the braking process. The following description of the method of operation is limited, in essence, to the regulation of the tape speed during the braking process in the time period t3–t4.

Figure 4:
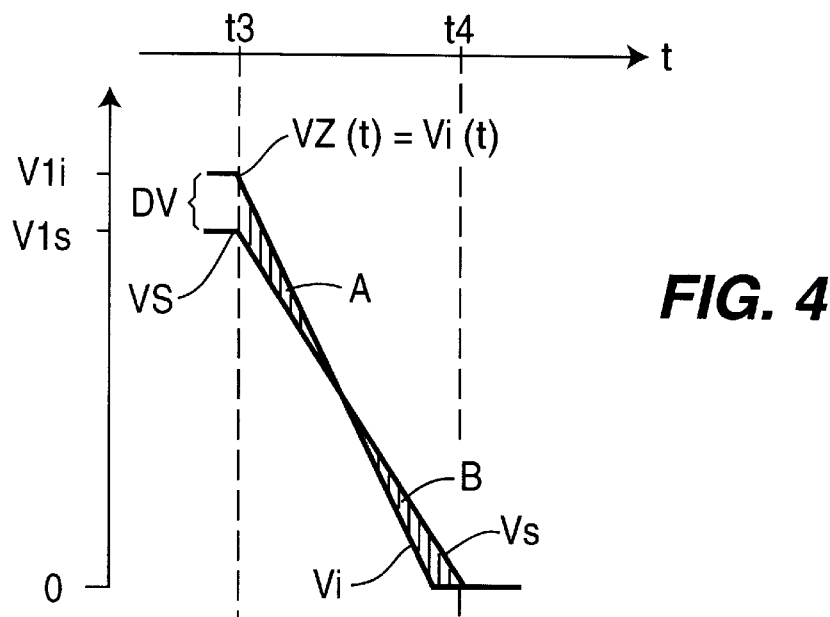

It is to be assumed that at the time point t3, the actual speed V1i does not coincide exactly with the reference value V1s. The actual value V1i of the speed may lie above V1s for example, as is illustrated in FIG. 4. In order that the tape 12 is braked at the latest at the time point t4 in such a way that it comes to a stop with the remaining length of tape p, the waveform of target speeds Vz(t), to which the real actual values Vi(t) of the speed are regulated, is determined by the control device 19. It is assumed in FIG. 4 that the waveform of the target speeds Vz(t) corresponds exactly to the waveform of the actual speeds Vi(t).

As already mentioned, it is essential that the tape 12 comes to a stop at a predetermined position. In principle, the speed waveform thereby only plays a secondary role. However, since $$vi(t)=dLi/dt$$

where: Vi(t)=the actual speed of the tape and dLi/dt=the wound on length of the tape per unit of time, the length Li of the wound on tape can also be determined through the regulation of the speed Vi(t). The desired regulation of the length Li is achieved in that a regulation with respect to the integral between the curve Vi and the curve Vs is realised. That is to say, the area A illustrated in FIG. 4 has to be equal to the area B.

Expressed mathematically, this may be achieved through the following considerations. The reference speed Vs(t) in the time interval t3–t4 is determined by the following equation:

$$Vs(t)=V1s-k*t; \; k: \text{slope}. \tag{1}$$

The slope k may be the same or different for different modes of operation such as for example, normal slow motion, slow motion of long play recordings, play back after a pause, automatic search or the like. If k is the same, then one needs less storage and the method steps described more fully hereinafter are similar for the said modes of operation.

The waveform of the target values Vz(t) is given by $$Vz(t)=V1s+DV-(k+DK)*t \tag{2}$$

where
V1+DV=V1i and
k+DK: slope of Vz(t)

The control device 19, in which the waveform of Vs(t) is stored, determines, by means of an elementary mathematical calculation $$Dk=DV/V1s*(2+DV/V1s)*k. \tag{3}$$

A corresponding regulation of the actual values Vi(t) to the waveform of the target values Vz(t) is effected by the control device 19 through evaluation of the pulses FG and by control of the motor 18. However, it is also possible to only control the motor 18 instead of regulating it.

If one assumes a voltage control for the control of the motor 18, then the value progression of the corresponding control voltage U(t) can be determined on the basis of the following considerations.

One starts from the generally known equation $$U=R*I+E+L*dI/dt \tag{4a}$$

where
R: internal resistance
I: the current flowing through the motor windings
E: mutual induction voltage,
L: the inductance of the motor wherein
   E=a*v
a: motor constant,
v: rotational speed of the motor.

Since one can usually assume that L/R is substantially smaller than the mechanical time constant of the motor, the equation (1a) simplifies to $$U=R*I+E \tag{4}$$

The current I is proportional to the torque D, i.e.

$$I=c*D(c=\text{constant}), \tag{6}$$

and the torque D is $$D=r+J*dv/dc \tag{7}$$

where
r: measure for the frictional loss
J: torque mass
v: rotational speed of the motor.
There thus results $$U-r=a*v+b*dv/dt \tag{8}$$

$$\text{where } b=c*J*R=\text{constant}. \tag{8a}$$

If a speed Vs(t)=V1s−k*t (see equation (1)) is to be realised, then the control signal U(t) has to have the form $$U(t)=f*t+g \tag{9}$$

(see also equation (8)). Conversely, there results from a control of the form $$U(t)=f*t+g \tag{9}$$

by solving the equation (8) for Vs(t)

$$Vs(t)X+Y*t*C*exp(-t*a/b). \tag{10}$$

where
X=a+f
Y=(g*a−f*b)/a²

C: constant, which is determined by the starting conditions.
At the time t=0, there results $$V=Y+C=V1s+DV. \quad (11)$$

In order to attain C=0, one has to have
Y=V1s+DV.

Figure 5:
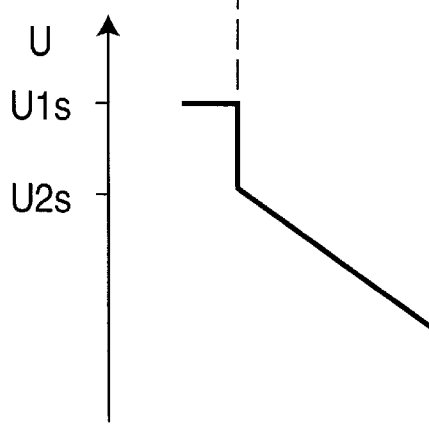
FIGS. 5, 7 illustrate waveforms of the motor control voltages during a braking process.

Consequently, for the realisation of the waveform Vs(t) as is illustrated in FIG. 4, there results the following waveform Us(t) for the control voltage of the motor 18, as is illustrated in FIG. 5:

for the initiation of the braking process at the time point t3,
Us jumps from a starting value U1s, which is required for the realisation of the tape speed V1s, up to a value
U2s=U1s−b*k; (b constant, see above)
thereafter, U is regulated down with the slope
−a*k
wherein
a, b are the already mentioned motor constants and
k is that particular value with which the reference speed Vs(t) is also brought down in the time interval t3–t4 (see equation (1)).

There thus arises for the waveform of U(t) in the time interval t3–t4:

$$U(t)=U1s-b*k-a*k*t. \quad (12)$$

The motor constants a and b are given magnitudes and can be easily determined. Therewith, the jump and the ensuing waveform can also be easily determined. If it arises, as already explained with the help of FIG. 4, that the tape 12 does not have the speed V1s at the time point t3 but rather a speed V1i deviating therefrom, then the value k+DK is to be used in the above equation instead of k.

As a rider, it should be mentioned that the transmission path between the motor 18 and the tape 12 must also be taken into account in these constants.

Moreover however, tolerances for the two constants a, b are also to be taken into account. These depend on the video apparatus, the video cassette being used, the temperature and the like. The values which are relevant at any one time can be newly determined by adaptive processes. One example of such a process is described below.

The waveform U(t) in FIG. 5 can be realised either by a pure control or by a combination of control and regulation. Preferably to this end, the jump and/or the ensuing waveform or a part thereof, can be controlled to begin with. That is to say, corresponding step functions may be used. The further waveform can be optimised by a regulation through which a regulated jump Sp and a regulated waveform Sl is determined. From the thereby resulting total waveform Sp+Sl in the interval t3–t4, the constants a and/or b can be determined more accurately. The corresponding values of these constants may be stored for further control processes. Thereby, a dependence of these values on the video tape being used, on its position, on the temperature, on the video apparatus and/or on various parameters can be taken into account. Corresponding starting values may already be stored, from the beginning, in the factory.

The values of a and b may also serve for the purpose of setting other operating quantities. Such an operating quantity is for example, the limiting of the current for the control of the motor 18. This consideration arises by reason of the equations (4) and (5).

The following processes for the correction of a and b are mentioned in particular:

1. The value determined by regulation
Sl=dU/dt
is regulated such that
dv/dt=−(k+DK)
If the actual value is called
dv/dt=$k_{is}$
and the actual value
a=$a_{ref}$,
then at any one time
Sl=$a_{ref}*k_{is}$,
wherein $k_{is}$ and Sl are known. Thereupon
Sl/$k_{is}$ is formed. If
Sl/$k_{is}$ is greater than a, then a is increased; in case
Sl/$k_{is}$ is smaller than a, then a is reduced
Preferably, a is refined step by step and not calculated in accordance with the relationship a=Sl/$k_{is}$.

If b is not determined correctly, then there results an exponential remainder and the following applies
Sl approximates to $a_{ref}*k_{is}$.

For this reason, relative steps of a i.e. da/a, should be smaller than relative steps of b as explained in the process described under 2 below.

2. In case the waveform of the regulated control voltage U(t) at the beginning of the interval t3–t4 is greater than at the end of this interval and in case the actual speeds Vi correspond to the target speeds Vz at the beginning and at the end, then a value b1 is replaced by a value b2 which is larger than b1: and vice versa. (This results from the necessary correction of the exponential terms).

As a rider, it should be mentioned that in the description of the method up to now, a rigid coupling of the tape 12 to the motor 18 was assumed. In practice however, there will be divergences from this which may be caused for example, by a slippage, by elasticity of a drive belt and/or of the video tape 12 and the like. These divergences may be recognised, for example, on the basis of pulses of the signal FG registered at a given time point and they may be balanced out for example, by a correction of the time point t3 and/or by an alteration of the reference slope k.

The description of the method up to here, which may be realised by the embodiment of FIG. 1, can then be utilised in particular when a very small resolution due to the pulses of the signal FG is present and/or when a coarse time resolution is available. If better conditions exist, then the method described below, which can likewise be realised by the embodiment of FIG. 1 with an appropriate arrangement of the control device 19, is utilised in preference.

Figure 6:
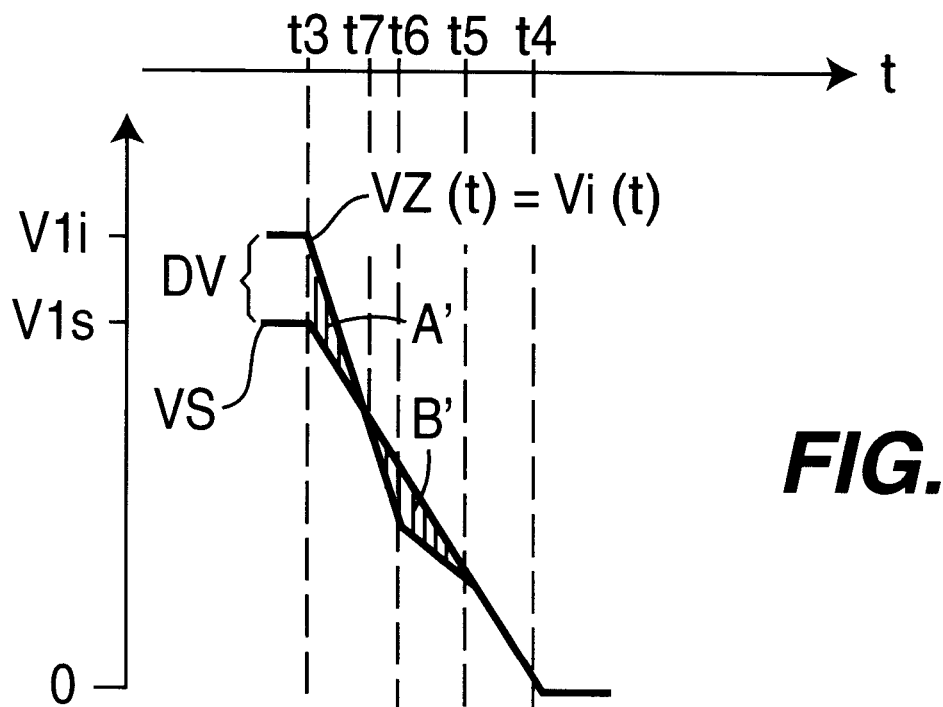

As is apparent from FIG. 6, in the method now being described, a complete balancing out of the effect of the different speeds V1s, V1i occurs not at the very end of the braking process but rather, earlier, at a time point t5 which may lie anywhere in the time interval t3–t4.

This has the advantage that possible divergences for the already unwound length of tape can still be compensated by a regulation process in the time interval t5–t4. Moreover, at the time point t4, a transition into the state of rest always takes place with substantially the same speed waveform independently of the speed V1i. Thereby, possible fluctuations in the regulation are disregarded. By so doing, the differences due to errors caused by slippage and elasticity are similar. For one type of apparatus, these can be partly determined in advance in dependence on the temperature, the tape length, the position of the tape and/or the like and they can be partly compensated by simple measures. Since the actual braking time corresponds to the braking time given by the waveform of Vs(t), the synchronisation with the video head 16 is improved.

In a preferred embodiment, t5 is selected in such a way that it lies two thirds within the time period t3–t4. Initially, the determination of the waveform of Vz(t) in the interval t3–t6 occurs in accordance with (see FIG. 6)

Vz(t)=V1s+DV−(k+d'k)*t.

This means that d'k has to be determined. A minimum value for d'k, which is used in case t5 should be identical with t4, is $d'k_{min}=(1+2^{0.5})*k*Dv/V1s$.

However, in the event that the length of the phase t5–t4 should amount to one third of the total braking time t3–t4, as in the preferred embodiment, then $d'k=1.5*(1+2^{0.5})*k*DV/V1s$.

The error in the unwound length of tape is at its greatest when the curve Vz(t) cuts the curve Vs(t) i.e. when V1s−k*t=V1s+DV−(k+d'k)*t.

The corresponding time point t7 thus occurs at t7=t3+DV/d'k.

The time point t6, at which the maxi error is half compensated, is arrived at from $t6=t3+t7*(1+1/2^{0.5})$.

However, the time point t6 may also be determined by a regulating process in such a way that the maximum error is half compensated at this time point. The correction of the residual error in the range t6–t5 is achieved by a waveform of the curve Vz(t)

Vz(t)−M−(k−d'k)*t
where $M=V1s−Dv*(1+2^{0.5})$.

Thereby, t5 is given by $t5=t3+t7*(1+2^{0.5})$.

From the time point t5, at which the error in the advanced tape length is theoretically zero, the curve Vz(t) proceeds in the same way as the curve Vs(t). The real actual speed values Vi(t) are regulated on the curve Vz(t). For this, generally known regulating processes may be used which provide for a proportional, integral and/or differential regulation. In this embodiment, possible regulation divergencies are so tiny that they are not illustrated in FIG. 6.

Figure 7:
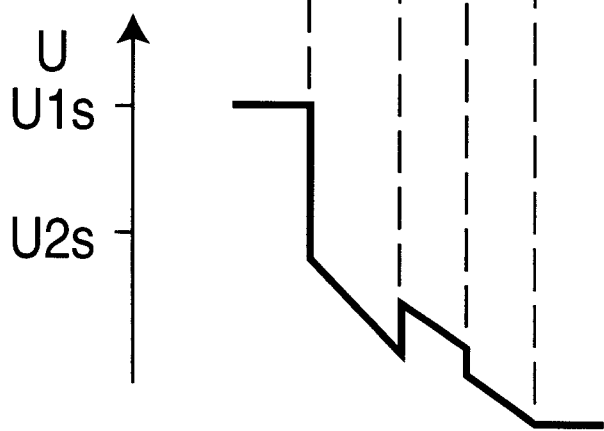

FIG. 7 shows the waveform of the control voltage of the motor 18 for the method illustrated in FIG. 6.

A voltage jump is provided for each alteration of the slope of Vz(t) for the compensation of the already mentioned exponential terms. At the time point t3, there follows a first jump Sp1 with Sp1=−b*(k+d'k)

and thereafter a waveform Sl1 with

Sl1=−a*(k+d'k).

At the time point t6, a second jump Sp2 is provided with

Sp2=+b*2*d'k and a second waveform Sl2

Sl2=−a*(k−d'k).

After the third jump Sp3 at the time point t5

Sp3−b*d'k there follows the waveform Sl3

Sl3=−a*k.

In the second embodiment too, the waveform U(t) can be realised either by a pure control or by a combination of control and regulation.

In a further version of this embodiment, the time point t6 may be displaced for later braking phases to the time point t5 in dependence on the actually remaining residual tape length L(t5) or in dependence upon the difference DL(t6)=L(t5)−L$_{ref}$(t5)

in accordance with the following conditions:

a) if DL(t5)*d'k is less than zero, t6 is brought forward, b) if DL(t5)*d'k is greater than zero, t6 occurs later.

A truncation criterion for t6–t5 can be, if V(t)=Vz(t) or L(t)=Lz(t).

Alternatively to the correction of t6, the following procedure may be carried out in the interval T6–t5. The actual position Li and the actual speed Vi are measured at a time t' which lies anywhere within the interval t6–t7. A new value k' is determined for this time t' which is used instead of the previous value k−Dk. If the curve v for dV/dt=−k' meets the reference speed Vs=V1s−k*t at t5, then so too should the positions L(t) and L$_{ref}$(t). The determination of the appropriate value k' arises from the following calculation $$k' = \frac{2*k*(L(t') - V(t')*t') - V(t') - V1s)^2}{2*(L(t') - t'*V1s) + k*t'^2}$$

An offset can be added to this k' which serves the purpose of balancing out the error in the position following the overshoot after t5. This offset can be corrected from one step (t0–t4) to the other.

In the last phase (t5–t4) of the braking process, there may be provided a regulation by reason of the speed waveform or, in addition, a further regulation with respect to the residual tape length may also be effected.

Versions of the said embodiments may have at least one of the following variations:

the exact braking of the video tape 12 may also serve for the recording of items of information. These may be first time recordings or other things such as for example, the dubbing of or fading-in to previously recorded pictures;

instead of bringing the video tape 12 to a halt, other tapes may also be stopped at predetermined positions. These tapes may be suitable for the recording and/or reproduction of items of information such as data, pictures and/or sound on the basis of optical, electric and/or magnetic methods;

Errors, which are caused by slippage, elasticity or the like of the tape or by other means in the apparatus, may be balanced out by altering the beginning of the braking phase (t4) and/or by altering the waveform Vs(t) or Vz(t). Thus for example, the waveform Vs(t) may be chosen as follows:

Vs'(t)=k/(T+t)$^2$; T is constant;

errors during read-out of the items of tape information may be determined automatically;

the waveform of Vs(t) or Vz(t) may be selected in such a way that mathematical processes can be carried out more simply;

the braking phases may also be used for a rapid search and/or for a rapid rewind in the case that the tape is to be stopped at a predetermined position;

in case the motor 18 is not controlled by a direct voltage but rather, by a pulsed voltage such as for example, by pulse width modulation (PWM), pulse length modulation (PLM), or by other control signals, then the conversion of the speed waveforms into the control signals is to be undertaken correspondingly;

the waveform of the control signals for the motor 18 may also be used for the purpose of realising a pure regulation. That is to say that a jump at t3, t5 and/or t6 is not carried out. A preferred solution of this idea is the following consideration. Starting from the equation $L_{ref}=V1s*t-(½)*k*t^2$ where: L$_{ref}$: reference tape length, which results from the equation (1), the appertaining actual tape position $L_{is}$ (p, p−1, ... p−n, ... 0) and the appertaining time (t3, ... t4) is determined for each pulse of the signal FG. The difference value $$DL = L_{ref} - L_{is}$$

serves for example, for the determination of the following regulation magnitudes for a PID regulation:

Kp*DL+Kd*(DL/dt)+Ki*Intergral(Dl*dl)

where

Kp, Kd, Ki: regulating constants for proportional, differential or integral regulation Integral (..): single or double integral.

The use of the double integral has the advantage that the corresponding regulation is quicker and more accurate.

What is claimed is:

1. A method for controlling the speed of a tape for recording and/or reproducing items of information, wherein, from a first tape speed and from a first time point, said tape is caused to stop at a predetermined position corresponding to a last time point, defining a braking period, said method comprising the steps of:

providing a reference speed waveform having reference values as a function of time associated with the speed of said tape between said first time point and said last time point corresponding to the stop position of said tape;

measuring the actual speed of the tape at said first time point;

determining a target waveform based on the measured value of the actual speed, wherein said target waveform has an integral value of the area under said target waveform substantially corresponding to the integral value of the area under the reference waveform; and regulating the actual speed of said tape during the time period defined between said first and last time points to correspond to said target waveform speed.

2. Method according to claim 1, further comprising merging the target waveform into the reference waveform before the ending of the braking period.

3. Method according to claim 2, wherein the step of controlling further comprises generating control signals for controlling a motor for determining the speed of the tape before said braking period, wherein the initiation of said braking period occurs in accordance with the target waveform.

4. Method according to claim 3, wherein the step of controlling further comprises adaptively altering the actual speed value corresponding to the curve of said target waveform by stepped adjustments to a control variable to compensate for deviations between said target and reference waveforms.

5. Method according to claim 4, further comprising the step of removing errors which are caused by elasticities or by slippage of the tape by modifying said first time point defining the beginning of the braking process and/or modifying the curve of said target waveform.

6. Apparatus for controlling the speed of a tape for the recording and/or reproduction of items of information, wherein, from a first tape speed and from a first time point, said tape is caused to stop at a predetermined position corresponding to a last time point, during a braking process defined by said first and last time points in accordance with a predetermined reference speed waveform, said apparatus comprising:

tachometer means for measuring the actual speed of said tape at said first time point;

a drive for effecting transport of said tape at a defined speed; and control means for controlling said drive and regulating the actual speed to cause said tape to stop at said predetermined position, said control means responsive to said measured tape speed for determining a target waveform of speed values in order to control or regulate the actual speed values during said braking process in accordance with said target waveform, wherein said target waveform of speed values has an integral value of the area under said target waveform which substantially corresponds to the integral value of the area under the reference speed waveform.

7. Apparatus according to claim 6, wherein the target waveform of speed values merges into said reference waveform of speed values before the ending of the braking process.

8. Apparatus according to claim 6, wherein said drive includes a motor for driving said actual tape speed, and wherein said control means provides control signals to said motor to initiate said braking process, said control means operative to determine the speed of said tape before the braking process in order to permit braking to occur in accordance with the target waveform.

9. Apparatus according to claim 8, wherein said control means further comprises means for adaptively altering the actual speed values corresponding to the curve of said target waveform by stepped adjustments to a control variable to compensate for deviations between said target and reference waveforms.

10. Apparatus according to claim 9, wherein errors which are caused by elasticities or by slippage of the tape are balanced out by modifying the determined first time point defining the beginning of the braking process and/or by modifying the curve of the target waveform.

11. A method for controlling the speed of a tape from a first speed at a first time to cause said tape to stop at a predetermined position corresponding with a second time, defining a braking period, said method comprising:

measuring actual speed of a tape at a time before said first time;

determining a target speed waveform for said braking period, said target speed waveform representing a voltage control or time control variable and comprising a controlled time interval including said second time and during which a generally constant slope voltage is applied to said capstan motor; and controlling a capstan motor driving said tape for controlling actual speed of said tape in accordance with said target speed waveform during said braking period.

12. Method according to claim 11, where in said target speed waveform further comprises a generally constant reverse voltage in combination with said slope voltage.

13. Method for controlling speed of a tape comprising:

coupling a tape transport motor to a tape for driving said tape;

applying a control signal to said tape transport motor during a given time period;

varying said control signal at a substantially constant slope; and effecting a substantially constant slope deceleration of said tape by said varying of said control signal at said substantially constant slope during said time period.

14. Method according to claim 13, wherein said control signal is a control voltage, said transport motor comprises a DC motor, said control voltage is jumped from a first value to a second value at the start of said time period, said control voltage is varied in accordance with said constant slope from said second value to a third value at an end of said time period, and said control voltage is jumped from said third value to a fourth value at the end said time period.

15. Method according to claim 14, wherein said second value is greater than said first value, said third value is less than said second value, and said fourth value is less than said third value.

16. Method according to claim 15, wherein said time period is within the first ⅔ of a braking period during which said tape is brought to a stop at a predetermined position after said time period.

17. Method according to claim 16, wherein said time period is within a portion of a braking period ending with said tape being stopped at an intended position after said time period, said control signal in accordance with said substantially constant slope effecting said substantially constant slope deceleration of said tape to a desired speed at the end of said time period coinciding with a desired slope in deceleration of said tape for the remainder of said braking period.

18. Method according to claim 17, wherein said time period is preceded by a first deceleration of said tape and succeeded by a second deceleration of said tape, transitions from said first deceleration to said substantially constant slope deceleration during said time period and from said substantially constant slope deceleration to said second deceleration being effected by jumps in said control signal.

* * * * *